Patented Apr. 5, 1932

1,852,090

UNITED STATES PATENT OFFICE

MAXIMILLIAN JOSEPH REUSZ, OF DURKEE, OREGON, ASSIGNOR OF ONE-HALF TO EDWIN BENSON GRAVES, OF DURKEE, OREGON

WOOD PRESERVATIVE

No Drawing. Application filed April 26, 1930. Serial No. 447,780.

The present invention relates to improvements in wood preservatives and has for its principal object to provide a compound or solution to be applied to wood for rendering the same fire proof as well as germ and rot resisting.

In preparing my composition, I take the following ingredients, in the proportions designated.

| | Parts |
|---|---|
| Zinc chloride | 3 |
| Calcium hydroxide | 3 |
| Copper sulphate | 6 |
| Calcium oxide | 2 |
| Magnesium hydroxide | 3 |

Coloring as desired.

The zinc chloride, calcium oxide and copper sulphate are powerful germicides, rot fungus retarding agents. The calcium hydroxide and magnesium hydroxide when combined with carbondioxide of the air form carbonates which are sparsely soluble in water. The above agents are pulverized together until a very fine powder is produced.

The following elements are also used in the preparation of the present compound.

| | Parts |
|---|---|
| Sodium chloride | 20 |
| Magnesium chloride | 30 |
| Calcium chloride | 40 |
| Distilled or rain water | 110 |

The sodium chloride, magnesium chloride and calcium chloride are placed in solution with the distilled or rain water and this solution is heated to 100° centigrade and stirred together with the powder resulting from the admixture of the first group of elements. The entire mass is heated until foam no longer forms, the foam that forms being gradually skimmed off.

The solution is then allowed to cool down for approximately 72 hours and is then siphoned into a treating tank or retort where air pressure is employed to force the again heated solution into the wood to be treated.

Any appropriate means may be employed for spraying or otherwise treating the wood with my compound.

A preparation of the above mentioned character will protect the wood against germs and rotting and will also render the same fireproof. At the same time, the wood can be treated with my composition in the coloring of the wood.

I claim:

1. A preparation for treating wood consisting of zinc chloride, calcium hydroxide, copper sulphate, calcium oxide, magnesium hydroxide, sodium chloride, magnesium chloride, calcium chloride, water, and coloring matter.

2. A preparation for preserving wood consisting of zinc chloride three parts, calcium hydroxide three parts, copper sulphate six parts, calcium oxide two parts, magnesium hydroxide three parts, sodium chloride twenty parts, magnesium chloride thirty parts, calcium chloride forty parts, distilled water one hundred and ten parts and coloring matter as desired.

In testimony whereof I affix my signature.

MAXIMILLIAN JOSEPH REUSZ.